US008588374B2

(12) United States Patent
Urban et al.

(10) Patent No.: US 8,588,374 B2
(45) Date of Patent: *Nov. 19, 2013

(54) MULTI-USE TELEPHONE TEST SETS AND RELATED SYSTEMS

(75) Inventors: Blake R. Urban, Lenoir, NC (US); Jorge Cobas, Lenoir, NC (US)

(73) Assignee: AT&T Intellectual Property I, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/528,050

(22) Filed: Jun. 20, 2012

(65) Prior Publication Data

US 2012/0257726 A1    Oct. 11, 2012

Related U.S. Application Data

(60) Division of application No. 12/621,782, filed on Nov. 19, 2009, now Pat. No. 8,229,077, which is a continuation of application No. 10/428,407, filed on May 2, 2003, now Pat. No. 7,643,617.

(51) Int. Cl.
*H04M 1/24* (2006.01)
(52) U.S. Cl.
USPC ............... 379/21; 379/419; 379/433.04
(58) Field of Classification Search
USPC ............... 379/21, 419, 433.04
See application file for complete search history.

(56) References Cited

U.S. PATENT DOCUMENTS

| 3,775,677 | A |   | 11/1973 | Garrett et al. ............ 324/506 |
| 4,354,063 | A | * | 10/1982 | Kuka ...................... 379/433.04 |
| 4,682,346 | A |   | 7/1987  | Fath et al. |
| 4,691,336 | A |   | 9/1987  | Durston |
| 4,707,848 | A |   | 11/1987 | Durston et al. ............ 379/1.01 |
| 5,237,607 | A | * | 8/1993  | Diamantis .................. 379/419 |
| 5,511,108 | A |   | 4/1996  | Severt et al. ................ 379/21 |
| 5,583,912 | A |   | 12/1996 | Schillaci et al. ............ 379/21 |
| 5,592,528 | A |   | 1/1997  | Nelson et al. .............. 379/21 |
| 5,726,853 | A |   | 3/1998  | Chavannes |
| 5,778,050 | A |   | 7/1998  | Park, II ...................... 379/21 |
| 5,838,775 | A |   | 11/1998 | Montalbano ............. 379/93.23 |
| 5,841,857 | A |   | 11/1998 | Zoiss et al. |
| 5,857,011 | A |   | 1/1999  | Kennedy et al. ......... 379/29.06 |
| 6,005,921 | A |   | 12/1999 | Keefe et al. ............. 379/29.06 |
| D428,610  | S |   | 7/2000  | Zoiss et al. |
| D435,029  | S |   | 12/2000 | Zoiss et al. |

(Continued)

OTHER PUBLICATIONS

Linesman Telephone, Canford Audio, Technical Data, Jun. 1999, 4 pages, 02-024 (Issue 3).

(Continued)

*Primary Examiner* — Gerald Gauthier
(74) *Attorney, Agent, or Firm* — Myers Bigel Sibley & Sajovec

(57) ABSTRACT

Telephone test sets include a telephone test set housing and at least one lead that extends away from the telephone test set housing. The lead is configured to be coupled to a telephone line. A light source, a data port and/or a display are integrated with the telephone test set housing. The light source is configured to project light away from the telephone test set to illuminate an area adjacent the telephone test set. The data port is configured to receive a data jack operatively associated with a communications device. The display is configured to display identification information associated with the telephone line. Related methods and systems are also provided.

4 Claims, 8 Drawing Sheets

(56) References Cited

U.S. PATENT DOCUMENTS

| | | | |
|---|---|---|---|
| 6,424,700 B1 | 7/2002 | Thibon et al. | 379/32.04 |
| 6,516,053 B1 | 2/2003 | Ryan et al. | 379/21 |
| 6,556,661 B1 | 4/2003 | Ingalsbe et al. | 379/22.04 |
| 6,687,627 B1 | 2/2004 | Gunn et al. | 702/61 |
| 6,831,965 B2 | 12/2004 | Pharoah et al. | 379/22 |
| 6,847,718 B1 | 1/2005 | Hiraoka | 379/413 |
| 6,917,595 B2 | 7/2005 | Chang et al. | 370/248 |
| 7,062,035 B2 | 6/2006 | Wu et al. | 379/355.01 |
| 7,483,694 B2 | 1/2009 | Varanda | 455/423 |
| 7,643,617 B2 * | 1/2010 | Urban et al. | 379/21 |
| 7,778,664 B1 | 8/2010 | Fujisaki | 455/556.1 |
| 8,229,077 B2 * | 7/2012 | Urban et al. | 379/21 |
| 2001/0041603 A1 | 11/2001 | Auten et al. | 455/572 |
| 2002/0196908 A1 | 12/2002 | Hollenbeck et al. | 379/1.04 |
| 2004/0028192 A1 * | 2/2004 | Pelletier | 379/67.1 |
| 2004/0216239 A1 | 11/2004 | Simon et al. | 7/127 |
| 2004/0218730 A1 * | 11/2004 | Urban et al. | 379/21 |
| 2006/0002543 A1 | 1/2006 | Newland | 379/368 |
| 2006/0229114 A2 | 10/2006 | Kim, II | 455/575.1 |
| 2008/0212568 A1 | 9/2008 | So et al. | 370/352 |
| 2010/0022277 A1 | 1/2010 | An et al. | 455/566 |
| 2010/0067666 A1 * | 3/2010 | Urban et al. | 379/21 |
| 2010/0311476 A1 | 12/2010 | Boudreau et al. | 455/575.1 |
| 2012/0257726 A1 * | 10/2012 | Urban et al. | 379/21 |

OTHER PUBLICATIONS

TS21 Craft Test Set, Harris Corporation User Manual, Nov. 1996, pp. 1-5, Issue 1, P/N O11-724892-001.

* cited by examiner

MULTI-USE TELEPHONE TEST SETS AND RELATED SYSTEMS

CLAIM OF PRIORITY

This application is a continuation application of U.S. patent application Ser. No. 12/621,782, filed Nov. 19, 2009 now U.S. Pat. No. 8,229,077, which is a continuation of U.S. patent application Ser. No. 10/428,407, filed on May 2, 2003 now U.S. Pat. No. 7,643,617, the disclosures of which are hereby incorporated herein by reference in their entirety.

FIELD

This invention relates to telecommunications test equipment and related systems and methods, and more particularly to telephone test sets for use in testing telecommunications systems, and related systems and methods.

BACKGROUND

Telephone test sets have long been used by telephone linesman to test and/or monitor operation of a telephone line. As is well known to those having skill in the art, a telephone test set generally includes a housing, often shaped like a telephone receiver, that includes a keypad, leads for connecting the telephone test set to the telephone line and a monitoring circuit for listening to the telephone line. Exemplary telephone test sets are generally discussed in U.S. Pat. Nos. 4,682,346 to Faith et al., 4,691,336 to Durston and U.S. Pat. No. 5,726,853 to Chavannes and, thus, need not be discussed further herein.

Recently, the number of features offered by telecommunications service providers in combination with telephone service has greatly increased. In particular, a telephone customer can choose from a list of options including, for example, caller identification, call return, call waiting, three way calling and the like. Accordingly, telecommunications service technicians may have to deal with more than inoperable telephone lines. In other words, a customer's telephone service may function properly, but one or more of the features selected by the customer may not.

The increased number of features offered by telecommunications service providers may further increase the number of service requests received by the telecommunications service technicians. The increased number of service calls may, for example, create problems associated with tracking which service requests have been completed and which service calls have not been completed. Furthermore, the existence of an increased number of service calls may possibly make it more difficult to respond to all of the service calls during daylight hours. Existing test equipment, for example, telephone test sets, may not be configured to address service issues presented by the increased number of features associated with telephone service. Accordingly, improved test equipment may be desired.

SUMMARY

Embodiments of the present invention provide telephone test sets including a telephone test set housing and at least one lead that extends away from the telephone test set housing. The lead is configured to be coupled to a telephone line. A light source may be integrated with the telephone test set housing and configured to project light away from the telephone test set to illuminate an area adjacent the telephone test set.

In some embodiments of the present invention, the telephone test set may include at least one data port integrated with the housing and configured to receive a data jack operatively associated with a communications device. The at least one data port may include a fire wire port, an RJ11 port, an RJ45 port, a universal serial bus (USB) port and/or a serial port. The communications device may include a laptop computer, a palmtop computer, a personal data assistant (PDA), and/or a modem.

In further embodiments of the present invention, the telephone test set may include a display integrated with the housing configured to display identification information associated with the telephone line. The identification information may include a name of a current caller, a number of a current caller and/or an address of a current caller.

In still further embodiments of the present invention, the telephone test set may include a keypad integrated with the telephone test set housing. The light source may be further configured to illuminate the keypad when at least one key on the keypad is depressed.

In some embodiments of the present invention, the light source may be powered by a local battery in the telephone test set housing. The telephone test set may further include a charging circuit that is configured to charge the battery when the at least one lead is coupled to the telephone line. The light source may be configured to be powered by a central office battery coupled to the light source through the telephone line.

In further embodiments of the present invention, the at least one lead may be configured to clip to a tip line and/or a ring line of the telephone line. In still further embodiments the at least one lead may include a connector that is configured to clip to a tip line and/or a ring line of the telephone line.

Still further embodiments of the present invention provide systems for communicating with a website by a telephone linesman. The systems include a communications device that is configured to communicate with the website over a network and a telephone test set. The telephone test set includes at least one lead that extends away from the telephone test set housing and is coupled to a telephone line and a data port. The data port is configured to receive a data jack coupled to the communications device and to connect the communications device to the network over the telephone line.

Some embodiments of the present invention provide methods for connecting with a website by a telephone linesman. The methods include connecting at least one lead of a telephone test set that extends away from the telephone test set housing to a telephone line and connecting a data jack of a communications device to a data port of the telephone test set. The website is communicated using the communications device via the telephone test set and the telephone line.

Further embodiments of the present invention provide systems for troubleshooting a telephone line. The systems include a communications device including a data jack and a telephone test set. The telephone test set includes at least one lead that extends away from the telephone test set housing and is coupled to a telephone line and a data port that is configured to receive the data jack. The systems further include means for monitoring operations of the communications device.

Still further embodiments of the present invention provide methods for troubleshooting a telephone line. The methods include connecting at least one lead of a telephone test set that extends away from the telephone test set housing to a telephone line, connecting a communications device to a data port of the telephone test set, and monitoring operations of the communications device coupled to the data port of the telephone test set. Accordingly, telephone test sets can handle the increased number of features offered by the telecommunications service providers and/or service issues presented thereby.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. It will be understood that, when an element is referred to as being "connected" or "coupled" to another element, it can be directly connected to the other element or intervening elements may be present. In contrast, when an element is referred to as being "directly connected" or "directly coupled" to another element, there are no intervening elements present. Like numbers refer to like elements throughout.

Embodiments of the present invention will be described below with respect to FIGS. 1 through 8. Embodiments of the present invention can provide telephone test sets including a light source, a display and/or a data port integrated with a telephone test set housing. Integration of the light source, the display and/or the data port with a telephone test set may facilitate testing, monitoring and/or troubleshooting of, for example, telephone lines. For example, a light source may illuminate an adjacent area when technicians, for example, telephone linesman, are working at night, in manholes or in otherwise poorly lit areas. In another example, identification information may be displayed on the display to verify that certain features of the telephone line are functioning correctly as discussed further below.

Figure 1:
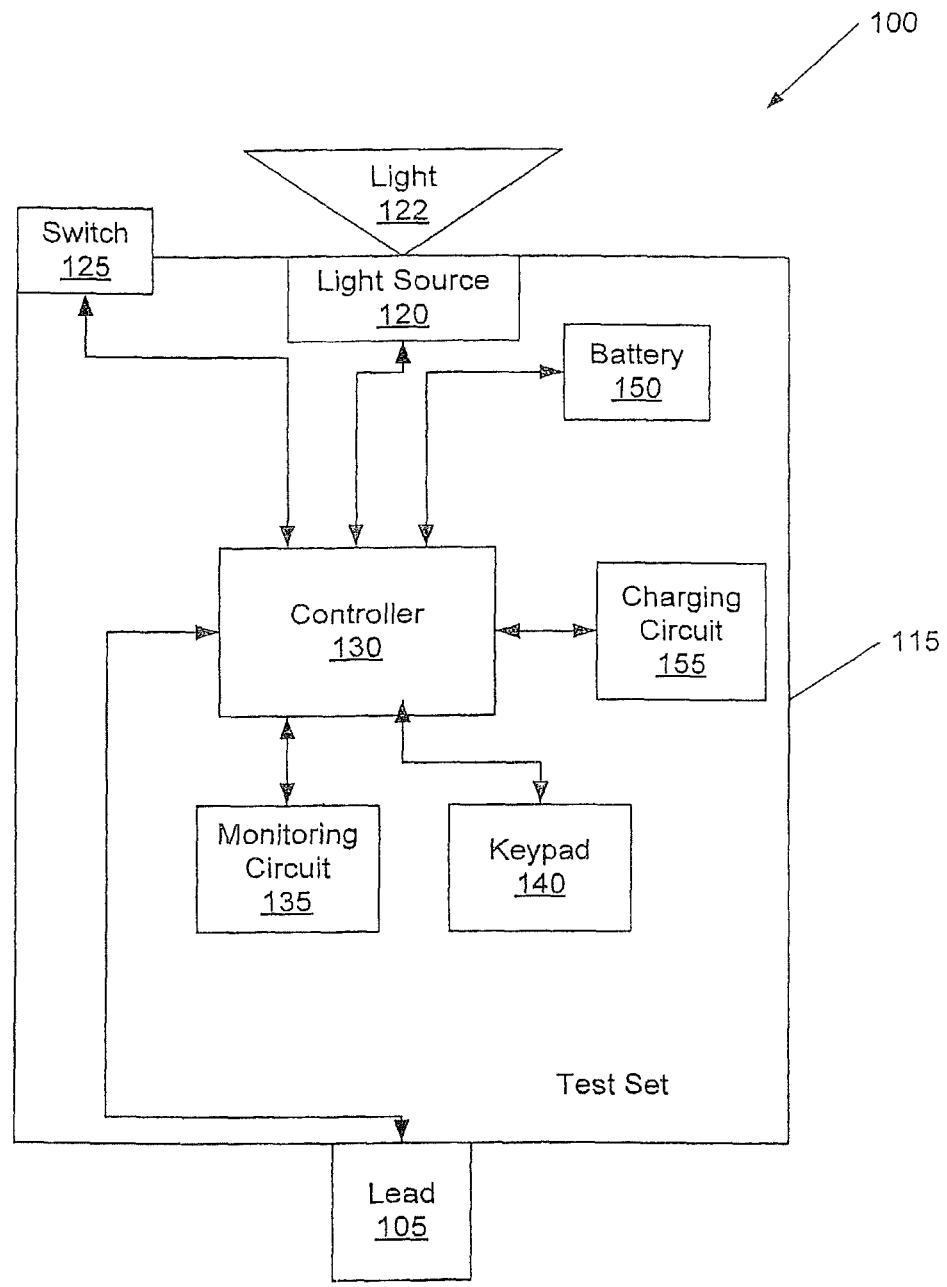
FIG. 1 is a block diagram illustrating telephone test sets according to some embodiments of the present invention.

Referring now to FIG. 1, a block diagram of telephone test sets according to some embodiments of the present invention will be discussed. As illustrated in FIG. 1, a telephone test set 100 may comprise, in a portable telephone test set housing 115, at least one lead 105, a light source 120, a battery 150, a monitoring circuit 135, a charging circuit 155, a switch 125, and a keypad 140 that communicate with a controller 130. It will be understood that the components provided in the telephone test set housing 115 of FIG. 1 are provided for exemplary purposes only and that telephone test sets 100 according to embodiments of the present invention are not limited to the illustrated configuration. For example, the telephone test set 100 may further comprise, in the portable telephone test set housing 115, a speaker, a microphone, a transceiver and the like that further communicate with a controller 130 without departing from the teachings of the present invention. Furthermore, the controller 130 may include functional modules not illustrated in FIG. 1 but which will be understood to those of skill in the art related to telephone test sets.

In accordance with some embodiments of the present invention, at least one lead 105 that extends away from the telephone test set housing 115 may be configured to be coupled to a telephone line. In certain embodiments of the present invention, the lead 105 may be a connector configured to connect the telephone test set 100 to a tip line and/or a ring line of the telephone line. The connector may be, for example, a plug cord. In other embodiments of the present invention, the lead 105 may be a clip, for example, a banana clip that is configured to be attached to the tip line and/or ring line of the telephone line. Once the at least one lead 105 is coupled to the telephone line, the monitoring circuit 135 may provide means for monitoring the functionality of the telephone line and/or equipment associated with the telephone line. For example, the monitoring circuit 135 may be configured such that the technician can listen to audible digital pulses or signals associated with the telephone line and make a determination as to whether the telephone line and/or equipment is functioning properly.

Access to, for example, the tip line and/or the ring line may be provided by a cross-connect frame. A cross-connect frame allows for circuit connections between two pieces of telephone equipment. The cross-connect frame typically contains access points, for example, jack access points, wire access points and/or pin access points, that may be used to, for example, test, monitor and/or troubleshoot the cross-connected telephone lines. The cross-connect frame may be wired to a central office. A jack access point on the cross-connect frame may be wired to one piece of central office equipment in the central office or respective sets of jack access points on a cross-connect frame may be wired to respective different pieces of central office equipment. The design, operation and functionality of cross-connect frames and equipment located at a central office are well known to those having skill in the art and need not be described further herein.

Referring again to FIG. 1, a light source 120 integrated with the telephone test set housing 115 is configured to project light 122 away from the telephone test set 100 like, for example, a flash light. The light source 120 may be provided by, for example, a light emitting diode (LED), a fluorescent light bulb, a halogen light bulb and/or an incandescent light bulb. Integrating the light source with the telephone test set housing 115 may allow a technician to illuminate a poorly lit area around the telephone test set 100. In certain embodiments of the present invention, the light source 120 may also be configured to illuminate the keypad 140 when a key on the keypad is pressed. It will be understood that the keypad may also be illuminated by a second light source (not shown) in addition to or instead of the light source 120 without departing from the teachings of the present invention.

The light source 120 may be powered by a local battery 150, i.e. a battery within or integrated with the telephone test set housing 115. A charging circuit 155 may charge the local battery 105. The charging circuit 155 is configured to charge the local battery 150 when the at least one lead 150 is coupled to the telephone line. In certain embodiments of the present invention, the light source 120 may be powered by a central office battery located in the central office coupled to the light source 120 through the telephone line. As further illustrated in FIG. 1, the light source 120 may be responsive to a switch 125 that may connect and/or disconnect the light source to and/or from the local battery 150 and/or the central office battery such that the light source 120 is turned on and/or off, respectively.

Integration of the light source 120 in the telephone test set housing 115 according to some embodiments of the present invention may provide an advantage over carrying, for example, a separate flashlight. For example, batteries in a flashlight may run dead, a flashlight may be left behind by accident, a sudden power outage may cause the poorly lit conditions and the like. In contrast, having a light source 120 integrated with the telephone test set 100 can increase the likelihood that a light source will be available when needed and the rechargeable capability of the light source will increase the likelihood that the light source will function when necessary.

Figure 2:
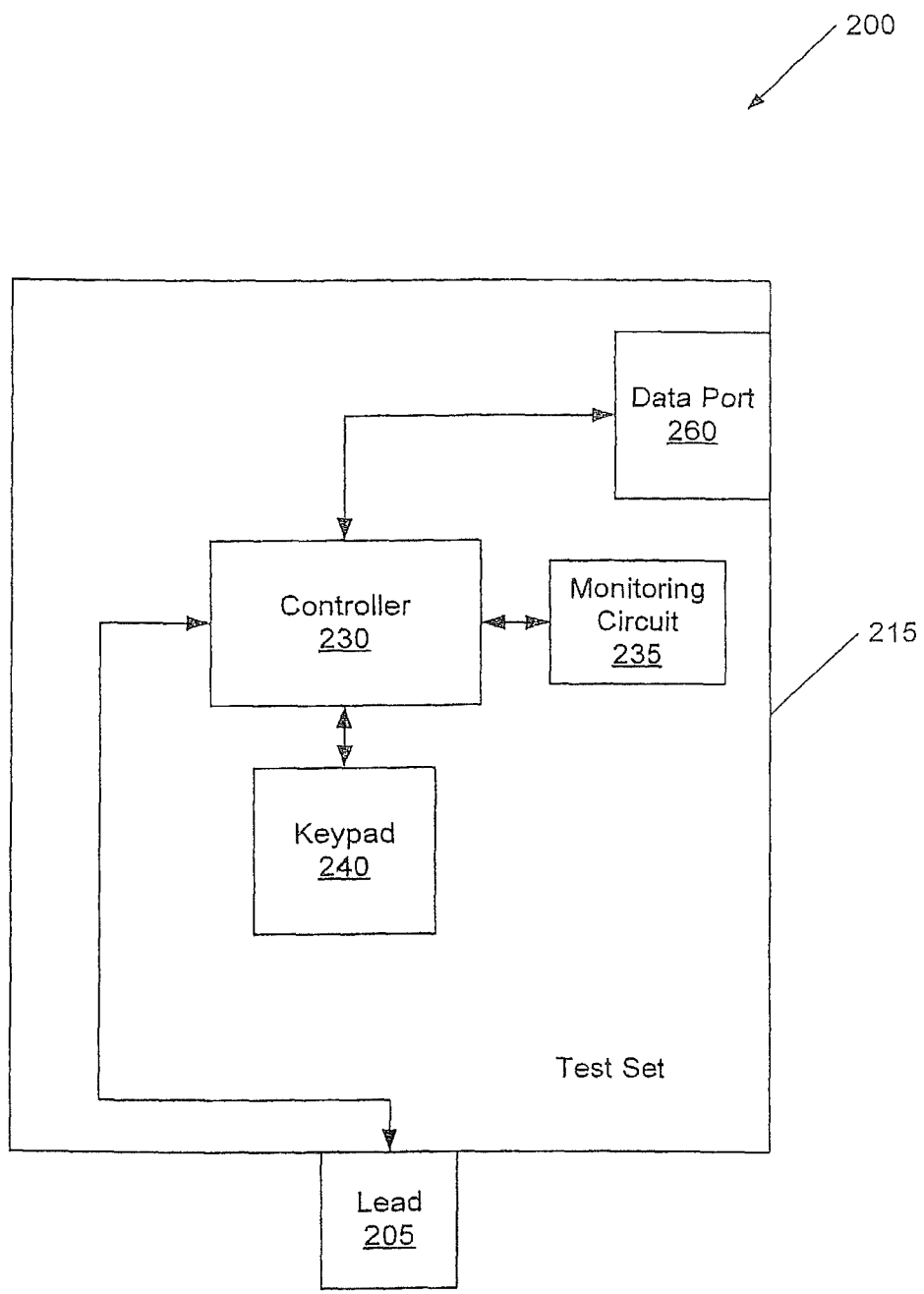
FIG. 2 is a block diagram illustrating telephone test sets according to other embodiments of the present invention.

Referring now to FIG. 2, a block diagram illustrating telephone test sets according to other embodiments of the present invention will be discussed. Operations of the controller 230, the keypad 240, the lead 205 and the monitoring circuit 235 are similar to the operations the controller 130, the keypad 140, the lead 105 and the monitoring circuit 135 discussed above with respect to FIG. 1 and in the interest of brevity will not be discussed further herein.

In accordance with some embodiments of the present invention, a telephone test set 200 may comprise, integrated with a portable telephone test set housing 215, at least one data port 260 that communicates with the controller 230. The data port 260 may be configured to receive a data jack operatively associated with a communications device. The at least one data port 260 may be, for example, a fire wire port, an RJ11 port, an RJ45 port, a universal serial bus (USB) port and/or a serial port. It will be understood that telephone test sets according to embodiments of the present invention may include one or more data ports. It will be further understood that telephone test sets according to embodiments of the present invention may include multiple data ports of different types and/or multiple data ports of the same type without departing from the teachings of the present invention.

It will be understood, that, as used herein, the term "communications device" may include a Personal Data Assistant (PDA) that can include a radiotelephone, pager, Internet/intranet access, Web browser, organizer, calendar and/or a global positioning system (GPS) receiver, a conventional laptop and/or palmtop receiver, a modem and/or other appliance capable of communicating voice and/or data over a telephone line.

In certain embodiments of the present invention, the communications device, for example, a laptop computer, may be plugged into the data port 260 of the telephone test set 200. As discussed above, the at least one lead 205 of the telephone test set 200 may be coupled to the telephone line. In these embodiments of the present invention, the laptop computer, for example, a TechNet laptop adapted for outdoor use, can connect to a website over a network through the telephone line. In certain embodiments of the present invention, the website may include a customer database containing customer records. A technician, for example, a linesman, may access the website including the customer database to, for example, close and/or receive service jobs. Integrating the data port 260 into the telephone test set 200 may enable a technician to access the website right at the test site without having to rig a connection to the telephone line or use the customer's land line. Thus, according to some embodiments of the present invention technicians may efficiently provide and/or receive information about service calls form the website and may, therefore, move from one service call to the next sooner than before.

In other embodiments of the present invention, the data port 260 may be used to connect, for example, a modem to the telephone line through the telephone test set 200. This may facilitate testing, monitoring and/or troubleshooting of the communications device and/or telephone line. The modem may be any modem known to those having skill in the art, for example, 33.3 Kb/s, 56.6 Kb/s, digital subscriber line (DSL), cable or the like. In particular, the technician may monitor the system for a free telephone line using, for example, the monitoring circuit 235, connect to a network using the modem, listen to the signals produced by the modem, using, for example, the monitoring circuit 235, and evaluate the functionality of the modem based on the signals.

Figure 3:
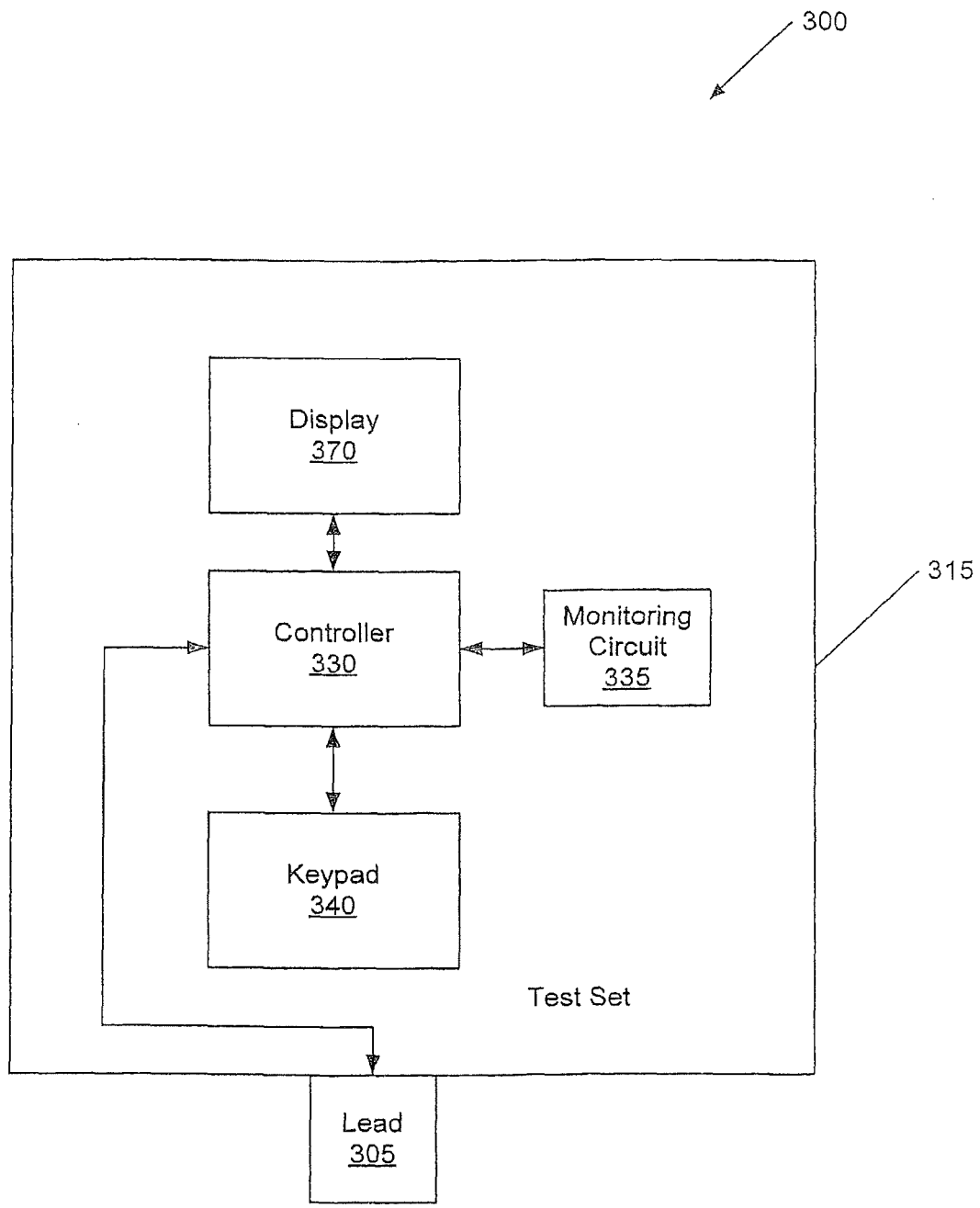
FIG. 3 is a block diagram illustrating telephone test sets according to yet other embodiments of the present invention.

Referring now to FIG. 3, a block diagram illustrating telephone test sets according to still other embodiments of the present invention will be discussed. Operations of the controller 330, the keypad 340, the lead 305 and the monitoring circuit 335 are similar to the operations the controller 130, the keypad 140, the lead 105 and the monitoring circuit 135 discussed above with respect to FIG. 1 and in the interest of brevity will not be discussed further herein.

In accordance with some embodiments of the present invention, a telephone test set 300 may comprise, integrated with a portable telephone test set housing 315, a display 370 that communicates with the controller 330. The display 370 may be configured to display identification information associated with the telephone line, for example, a name of a current caller, a number of a current caller and/or an address of a current caller. The display 370 may be a liquid crystal display (LCD). Integration of the display 370 with the telephone test set housing 315 may facilitate testing, monitoring and/or troubleshooting of features offered by a telephone service provider.

For example, if a customer selects caller identification as a desired feature on their telephone line, the technician can connect the telephone test set 300 to the telephone line using the at least one lead 305. The technician may have, for example, the home office, call the technician on the customer's telephone line and may monitor the accuracy of the caller identification feature by viewing the results on the display 370 provided in the telephone test set 300. Thus, viewing the caller identification information on the display may provide means for monitoring the functionality of caller identification feature. It will be understood that the monitoring circuit 335 may also be configured to monitor the caller identification information and provide a result without departing from the teachings of the present invention. Integration of the display 370 with the telephone test set 300 may eliminate the need for technicians to plug a separate caller identification unit into a customer's jack to verify the accuracy/functionality of the service.

Figure 4:
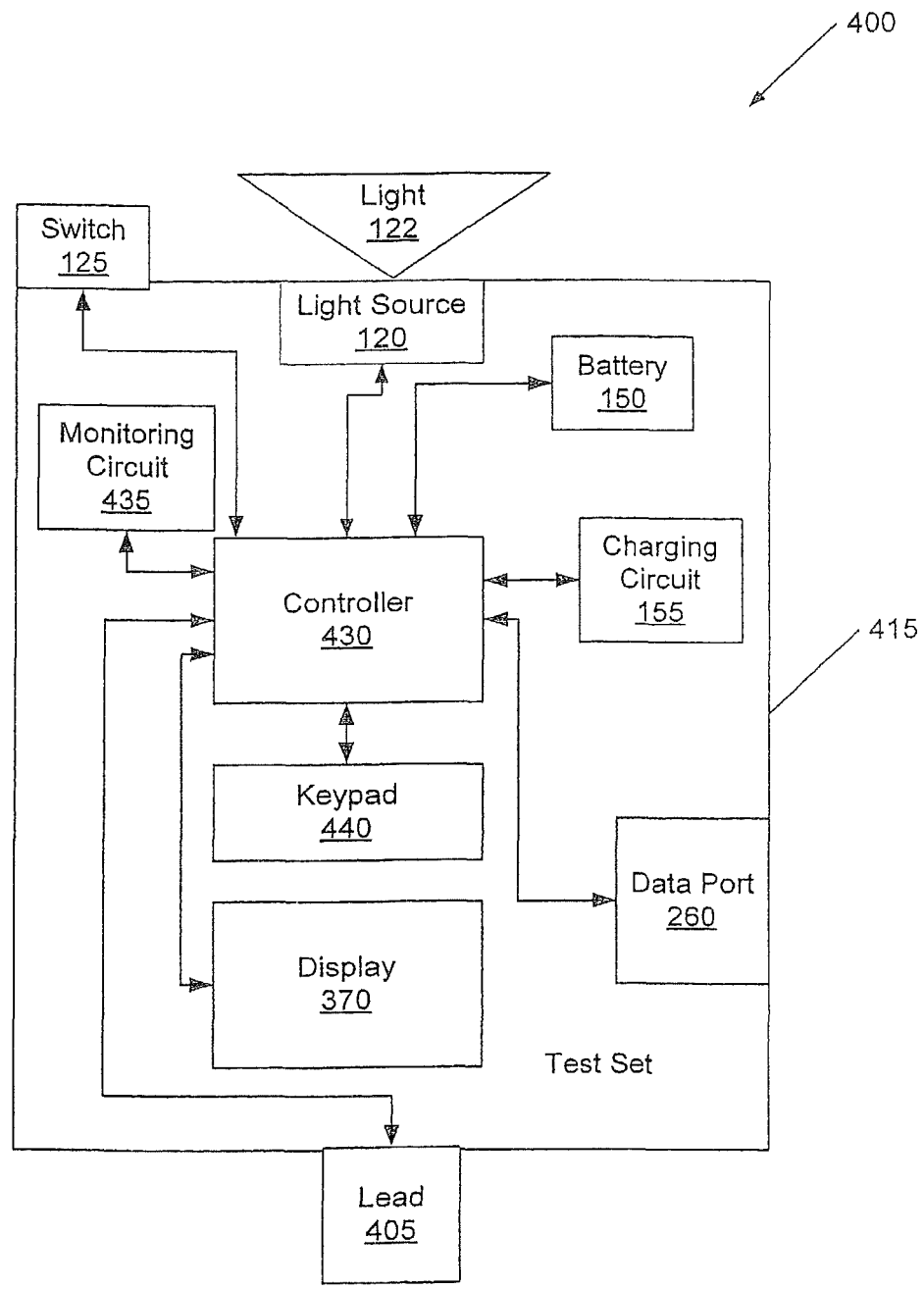
FIG. 4 is a block diagram illustrating telephone test sets according to still other embodiments of the present invention.

Referring now to FIG. 4, a block diagram illustrating telephone test sets according to yet other embodiments of the present invention will be discussed. Operations of the controller 430, the keypad 440, the lead 405, the monitoring circuit 435, the switch 125, the light source 120, the local battery 150, the charging circuit 155, the display 370 and the data port 260 are similar to the operations like named elements discussed above with respect to with respect to FIGS. 1 through 3 and in the interest of brevity will not be discussed further herein.

In certain embodiments of the present invention, a telephone test set 400 having the light source 120 integrated with the telephone test set housing 415 may be further configured to illuminate the display 370 when a key on the keypad 440 is depressed. It will be understood that the light source 120 may be configured to illuminate the display 370 and/or the display 370 may be illuminated by a second light source (not shown) without departing from the teachings of the present invention. Embodiments of the present invention illustrated in FIG. 4 may provide advantages discussed above with respect to FIGS. 1 through 3. For example, the light source 120 may enable a technician to work in poorly lit areas, the data port 260 may provide means for connecting to a network over a telephone line and testing, monitoring and/or troubleshooting the telephone line and/or a communications device, and the display 370 may provide a means for testing, monitoring and/or troubleshooting the telephone line and/or features associated therewith. It will also be understood that various other combinations and subcombinations of the blocks of FIGS. 1 through 4 may be provided in other embodiments of the present invention.

Figure 5A:
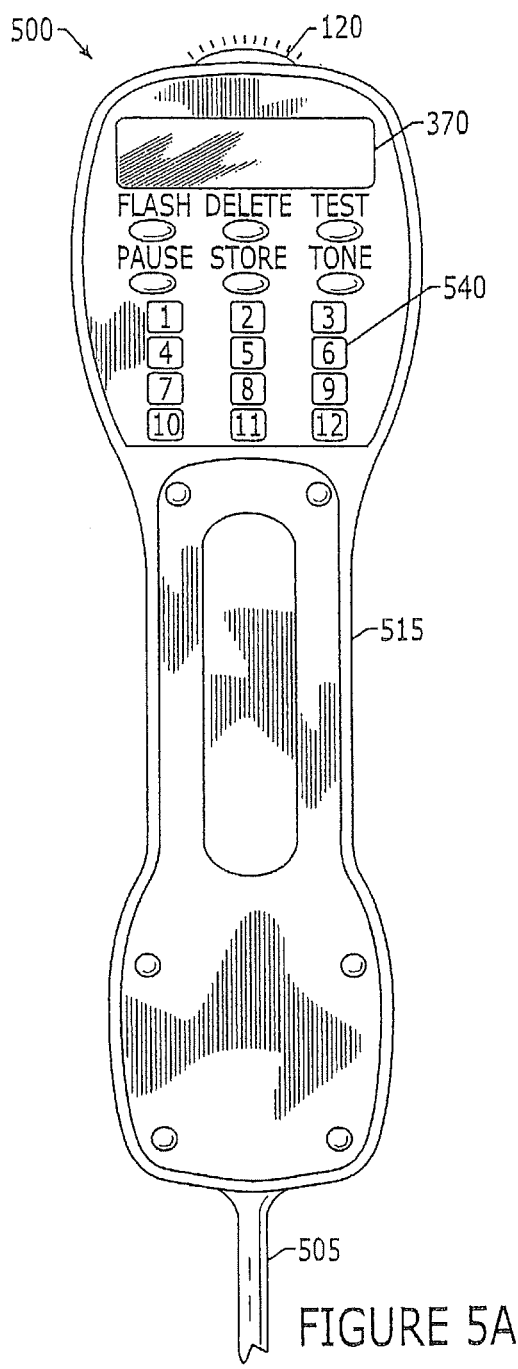
FIG. 5A is a top plan view of telephone test sets according to some embodiments of the present invention.
Figure 5B:
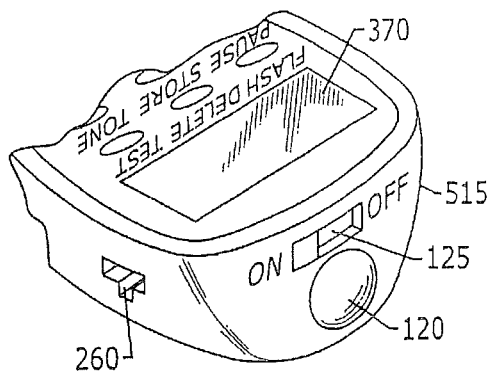
FIG. 5B is a perspective view of an upper end of telephone test sets according to some embodiments of the present invention.

Referring now to FIGS. 5A and 5B, a top plan view and a perspective view of an upper end of telephone test sets according to some embodiments of the present invention will be discussed. As illustrated in FIGS. 5A and 5B, the telephone test set 500 includes, integrated with a portable telephone test set housing 515, a keypad 540, a lead 505, a switch 125, a light source 120, a display 370 and a data port 260. Operations of these components are similar to like named components discussed above with respect to FIGS. 1 through 4 and in the interest of brevity will not be discussed further herein. It will be understood that FIGS. 5A and 5B are provided for exemplary purposes only and that the exterior appearance of telephone test sets according to embodiments of the present invention are not limited to this configuration. For example, the display 370, the data port 260 and/or the light source 120 may be removed from the telephone test set housing 515 of the telephone test set without departing from the teachings of the present invention.

Figure 6:
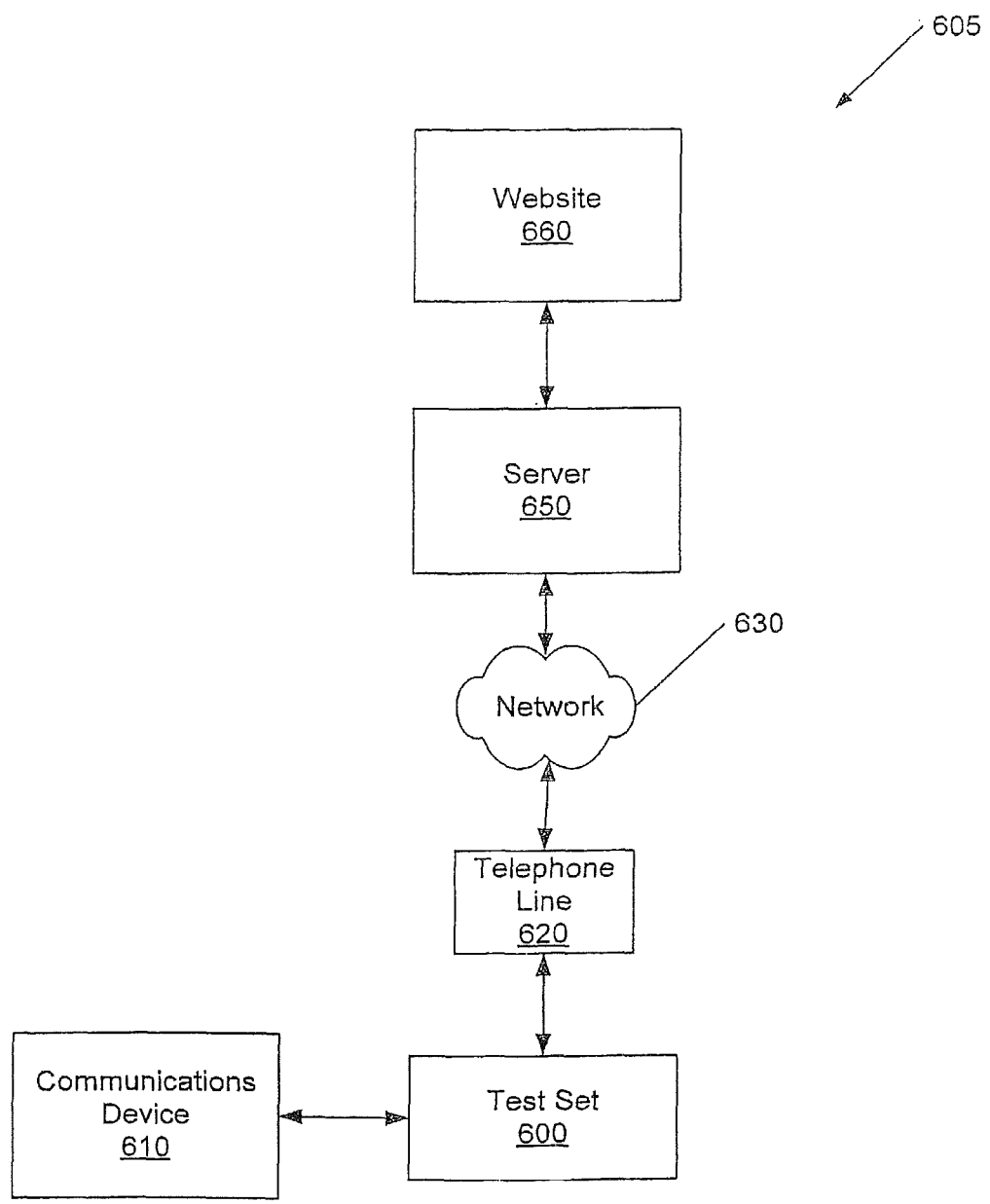
FIG. 6 is a block diagram illustrating systems in which telephone test sets according to some embodiments of the present invention may be used.

Referring now to FIG. 6, a block diagram illustrating systems in which telephone test sets according to some embodiments of the present invention may be used will be discussed. The system 605 may include a telephone test set 600, a communications device 610, a telephone line 620, a network 630, a server 650 and a website 660. The communications device 610 may communicate over the network 630, for example, the Internet, over the telephone line 620 through the telephone test set 600. The server 650 may also communicate over the network 630. Thus, the network 630 may provide a connection between the communications device 610 and the server 650 through telephone line 620. The server 650 may be an applications server, web server or the like.

The system 605, as illustrated in FIG. 6, also includes a website 660. It will be understood that the present invention is not limited to the configuration illustrated in FIG. 6. For example, the website 660 may be integrated with the server 650 without departing from the teachings of the present invention. In certain embodiments of the present invention, the website 660 may contain a customer database. The customer database may be accessed by, for example, technicians in the field to improve customer service, for example, decrease response times for service calls.

In particular, a communications device 610, for example, a laptop computer, may be coupled to the telephone test set 600 using a data port provided in the telephone test set 600 as discussed above with respect to FIGS. 2, 4 and 5. It will be understood that the telephone test set 600 may include any of the features discussed above with respect to FIGS. 1 through 5 without departing from the teachings of the present invention. At least one lead of the telephone test set 600 may be coupled to the telephone line. The technician may connect to the website 660 over the network 630 through the telephone line 620. The technician may access customer records stored in a customer database provided, for example, on the website 660 and may update customer records, for example, close out service calls responded to and/or obtain new service requests.

In certain embodiments of the present invention, the technician may access a telecommunications company intranet over the network 630. The telecommunications company intranet may also contain a database including customer records and information with respect to service calls/requests. The technician may update customer records on the telecommunications company intranet. It will be understood that the telecommunications company may provide access/login codes to the technicians to access the website for security purposes. The ability to conveniently access these customer records in the field and update them without having to rig a connection or use the customer's phone line may increase service efficiency.

In certain embodiments of the present invention, the communications device 610 may be, for example, a modem. The modem may be coupled to the telephone line 620 using the data port provided in the telephone test set 600. The technician may connect to the network 630, for example, the Internet, using the modem and may monitor the signals/pulses produced by the modem to determine if the modem is functioning properly. It will be understood that the communications device may be any piece of equipment that is configured to communicate voice and/or data over a network. It will be further understood that in certain embodiments of the present invention that the monitoring circuit discussed above with respect to FIGS. 1 through 4 may be configured to monitor the performance of the modem and, thus, provide monitoring means.

Figure 7:
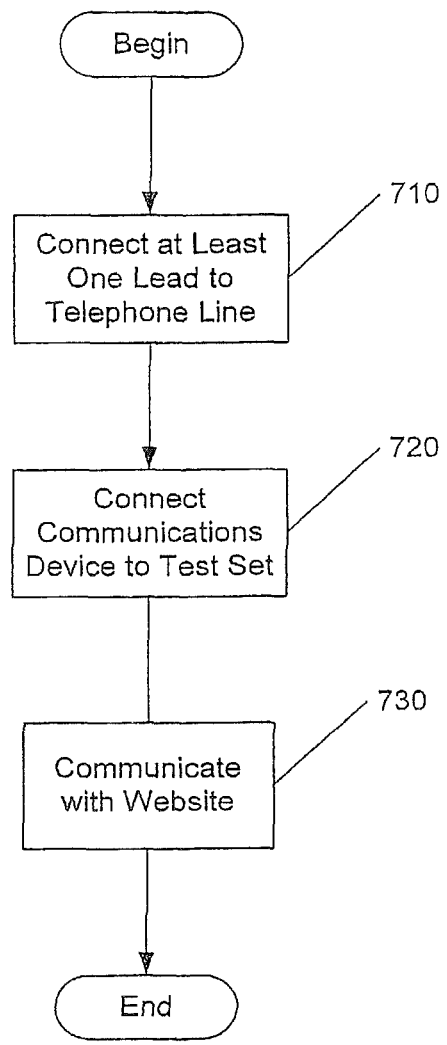
FIG. 7 is a flow chart illustrating operations of telephone test sets according to some embodiments of the present invention.
Figure 8:
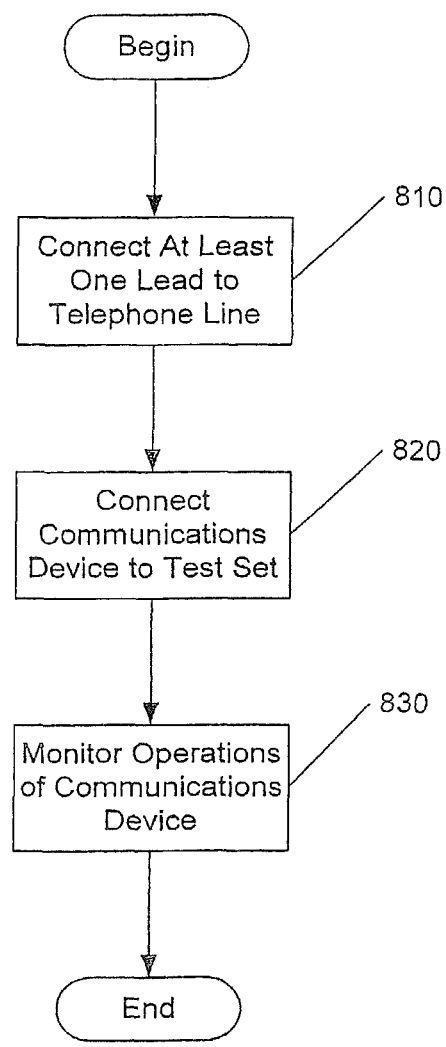
FIG. 8 is a flow chart illustrating operations of telephone test sets according to other embodiments of the present invention.

Operations according to various embodiments of the present invention will now be discussed with respect to FIGS. 7 and 8. FIGS. 7 and 8 are flowchart illustrations of operations that may be carried out by systems including telephone test sets according to various embodiments of the present invention. It will be understood that telephone test sets may include any of the components and/or functionalities discussed above with respect to FIGS. 1 through 5 without departing from the teachings of the present invention.

Referring now to FIG. 7, methods for connecting with a website by a telephone linesman will be discussed. At least one lead of a telephone test set is connected to a telephone line (block 710). As discussed above, in certain embodiments of the present invention the lead may be a connector configured to connect the telephone test set to a tip line and/or a ring line of the telephone line. In other embodiments of the present invention, the lead may be a clip, for example, a banana clip that is configured to be attached to the tip line and/or ring line of the telephone line.

A data jack connected to a communications device may be connected to a data port of the telephone test set to connect the communications device to the telephone test set (block 720). As discussed above, the data port may be, for example, a fire wire port, an RJ11 port, an RJ45 port, a USB port and/or a serial port. The data port of the telephone test set may be configured to connect the communications device to a network over the telephone line.

The communications device is connected to the website over the network through the telephone line (block 730). As discussed above, the website may include customer records stored in a customer database. The technician may update the customer records with respect to service calls in the database or receive information with respect to new service requests. In particular, the technician may both receive work orders and/or close out work orders.

It will be understood that in some embodiments of the present invention, the acts noted in the blocks of FIG. 7 may occur out of the order illustrated in FIG. 7. For example, two blocks shown in succession may, in fact, be executed substantially concurrently, or the blocks may sometimes be executed in the reverse order, depending upon the functionality involved. In particular, in certain embodiments of the present invention the acts of block 720 may be performed before the acts of block 710.

Referring now to FIG. 8, methods for troubleshooting a telephone line will be discussed. At least one lead of a telephone test set may be connected to a telephone line (block 810). A communications device may be connected to a data port of the telephone test set (block 820). Operations of the communications device coupled to the data port of the telephone test set may be monitored (block 830).

It will be understood that in some embodiments of the present invention, the acts noted in the blocks of FIG. 8 may occur out of the order illustrated in FIG. 8. For example, two blocks shown in succession may, in fact, be executed substantially concurrently, or the blocks may sometimes be executed in the reverse order, depending upon the functionality involved. In particular, in certain embodiments of the present invention the acts of block 820 may be performed before the acts of block 810.

In certain embodiments the communications device may be, for example, a modem. The lead of the telephone test set may be connected to the telephone line and the modem may be connected to the data port of the telephone test set. The technician may monitor the telephone lines for a free telephone line using, for example, a monitoring circuit and, using the modem, may attempt to connect to a network through the free telephone line. The technician may monitor pulses and/or signals produced by the modem and/or telephone line to determine if the modem and/or telephone line are functioning properly.

In some embodiments of the present invention, operations of the communications device may be monitored using a display integrated with the telephone test set housing that displays identification information. For example, if a customer is experiencing problems with a caller identification feature, the technician may have the home office call the customer's telephone line and may monitor the identification information on the display to determine if a problem exists with the caller identification feature. As discussed above the identification information may include a name of a current caller, a number of a current caller and/or an address of a current caller.

As discussed above with respect to FIGS. 1 through 8, incorporating one or more of a light source, a display and/or a data jack into a telephone test set may allow more efficient monitoring, testing and/or troubleshooting of telephone lines and/or communications devices associated with telephone lines by telephone technicians.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system for communicating with a website by a telephone linesman comprising:
   a communications device to communicate with the website over a network; and
   a telephone test set comprising:
      a lead that extends away from a telephone test set housing and is configured to be coupled to a telephone line and a data port to receive a data jack coupled to the communications device and to connect the communications device to the network over the telephone line;
      a light source integrated with the telephone test set housing, the light source being powered by a battery in the telephone test set housing; and
      a charging circuit to charge the battery in the telephone test set housing when the lead is coupled to the telephone line.

2. The system of claim 1, wherein the website comprises a customer database and wherein the communications device is further to update customer records stored in the customer database.

3. The system of claim 2, wherein the communications device is to update customer records, receive work orders and close work orders via the website.

4. The system of claim 1, wherein the communications device comprises a laptop computer.

* * * * *